B. W. FJELLMAN.
BALL BEARING.
APPLICATION FILED MAY 9, 1913.

1,091,822.

Patented Mar. 31, 1914.

WITNESSES:
Fred White
J. F. Wallace

INVENTOR:
Bengt Wiktor Fjellman,
By Attorneys.
Fraser, Turk & Myers

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-BEARING.

1,091,822.

Specification of Letters Patent. Patented Mar. 31, 1914.

Application filed May 9, 1913. Serial No. 766,493.

*To all whom it may concern:*

Be it known that I, BENGT WIKTOR FJELLMAN, a subject of the King of Sweden, and resident of Gottenborg, in the Kingdom of Sweden, have invented certain new and useful Improvements in or Relating to Ball-Bearings, of which the following is a specification.

This invention relates to improvements in ball bearings and has particular reference to a means for inclosing or mounting the ball bearing.

The present invention comprises a casing for a ball bearing which preferably is produced by stamping sheet metal, and comprises one sheet metal structure stamped to provide an inclosing sleeve for the bearing and a second sheet metal structure stamped to provide a cover for the sleeve.

A feature of the invention consists in providing a connection between the sleeve and the cover, formed by embossing or otherwise.

The accompanying drawings illustrate a preferred embodiment of the invention.

Figure 1:
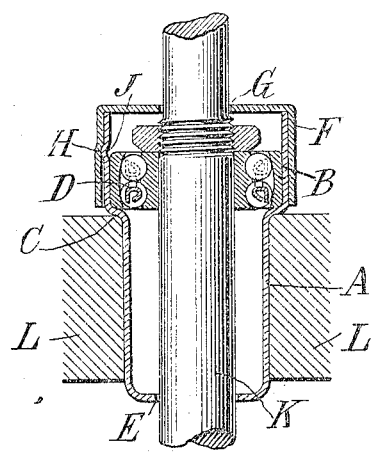
Figure 2:
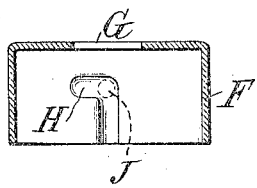

Figure 1 is a diametral section on the center line of the bearing and casing, and Fig. 2 is a diametral section of the cover on a plane at right angles to that of Fig. 1.

Referring to the embodiment of the invention illustrated, one structure forming an inclosing sleeve for the bearing has a portion A encircling a spindle or shaft K and an enlarged portion B providing a shoulder C to act as a support for the bearing D. The sleeve is made, according to a preferred method, by stamping from sheet metal, for instance from a round disk so as to provide the necessary features of the casing by successive stamping or pressing. A hole may then be cut or punched out from the portion A as at E to accommodate the spindle or shaft. The material forming the sleeve may be of comparatively thin sheet metal providing the necessary rigidity, and the sleeve may be so formed as to provide a comparatively large clearance between the spindle and the part A. This may be packed with any suitable material and the latter may be used to retain oil or other lubricant in the casing and to prevent it from leaking therefrom. Another structure forming a cover F is formed in a similar manner and a portion is removed to provide a hole at G to accommodate the spindle or shaft. For securing the cover in position, it is preferable to form a connection, such for example as a bayonet joint, between the cover F and the enlarged portion B, and this may be done by embossing the cover with an L-shaped groove, as at H, and embossing a stud or button as at J on the enlarged portion B so that the button may fit into the embossed groove H.

The casing for the bearing described in connection with the accompanying drawings is particularly useful in connection with vertically disposed spindles or shafts, the portion A fitting conveniently into a recess in the support or standard L carrying the shaft with the shoulder or abutment C bearing on the upper side of the support or standard. The lower end of the spindle may, if desired, be supported or held laterally in a foot step bearing or the like, or the casing A B C may form the support for the shaft and a steadying or guiding support may be provided for its lower end to prevent lateral or side play.

The details and particular formation of the casing may be modified to suit various requirements to which the casing may be applied.

What I claim is:—

1. A casing for a ball bearing, composed of two stamped sheet metal structures one having a portion A adapted to encircle the spindle of the bearing and an enlarged portion B adapted to form a sleeve encircling the bearing rings and forming a shoulder C to support the bearing, and the other structure constituting a cover F for said sleeve, said shoulder being adapted to rest upon a standard through which the smaller portion of said first structure can pass.

2. The combination with a spindle and a ball bearing therefor of a casing composed of two structures, one having a portion adapted to encircle the spindle and an enlarged portion adapted to form a sleeve encircling the bearing rings and forming a shoulder to support the bearing and the other structure constituting a cover for said sleeve, said shoulder being adapted to rest upon a standard through which the smaller portion of said first structure can pass.

3. The combination with a vertical spindle K and a ball bearing D therefor of a casing composed of two stamped sheet metal structures, one having a portion A adapted to encircle said spindle K and an enlarged portion B adapted to form a sleeve encircling the bearing D and forming a shoulder C to support said bearing and the other structure constituting a cover F for said sleeve, and a standard L having an opening through which said portion A passes, said shoulder C resting upon said standard.

In witness whereof, I have hereunto signed my name in the presence of two subscribing witnesses.

BENGT WIKTOR FJELLMAN.

Witnesses:
THEO. ROESBERG,
TOBIAS HALLGREN.